(12) United States Patent
Perelli et al.

(10) Patent No.: US 12,147,267 B2
(45) Date of Patent: Nov. 19, 2024

(54) COMPUTING DEVICE

(71) Applicant: LENOVO (SINGAPORE) PTE. LTD, Singapore (SG)

(72) Inventors: Thomas Perelli, Morrisville, NC (US); Ali Ent, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 106 days.

(21) Appl. No.: 17/877,962

(22) Filed: Jul. 31, 2022

(65) Prior Publication Data
US 2024/0036601 A1    Feb. 1, 2024

(51) Int. Cl.
*G06F 1/16* (2006.01)
*G06F 3/0482* (2013.01)

(52) U.S. Cl.
CPC .......... *G06F 1/1618* (2013.01); *G06F 1/1677* (2013.01); *G06F 1/1681* (2013.01); *G06F 1/1686* (2013.01); *G06F 1/1692* (2013.01); *G06F 3/0482* (2013.01)

(58) Field of Classification Search
CPC .... G06F 1/1618; G06F 1/1677; G06F 1/1681; G06F 1/1686; G06F 1/1692; G06F 3/0482
See application file for complete search history.

(56) References Cited

U.S. PATENT DOCUMENTS

| | | | |
|---|---|---|---|
| 2013/0163515 A1* | 6/2013 | Yeoh | H04W 88/08 370/328 |
| 2018/0120985 A1* | 5/2018 | Wallace | G06F 1/169 |
| 2019/0005722 A1* | 1/2019 | Murching | G06T 19/00 |
| 2019/0129511 A1* | 5/2019 | Clark | G06F 3/0202 |
| 2022/0236763 A1* | 7/2022 | Song | G06F 1/1662 |

* cited by examiner

*Primary Examiner* — Gevell V Selby
(74) *Attorney, Agent, or Firm* — Brian J. Pangrle

(57) ABSTRACT

A computing device can include a processor; memory accessible to the processor; a display housing that includes a display and a camera; a base housing that includes a keyboard and a camera viewfinder display for the camera; and a hinge assembly that couples the display housing and the base housing.

20 Claims, 10 Drawing Sheets

COMPUTING DEVICE

TECHNICAL FIELD

Subject matter disclosed herein generally relates to technology for computing systems or other systems.

BACKGROUND

A computing system can be a clamshell system that can fold and open and can include, for example, a base housing and a display housing.

SUMMARY

A computing device can include a processor; memory accessible to the processor; a display housing that includes a display and a camera; a base housing that includes a keyboard and a camera viewfinder display for the camera; and a hinge assembly that couples the display housing and the base housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
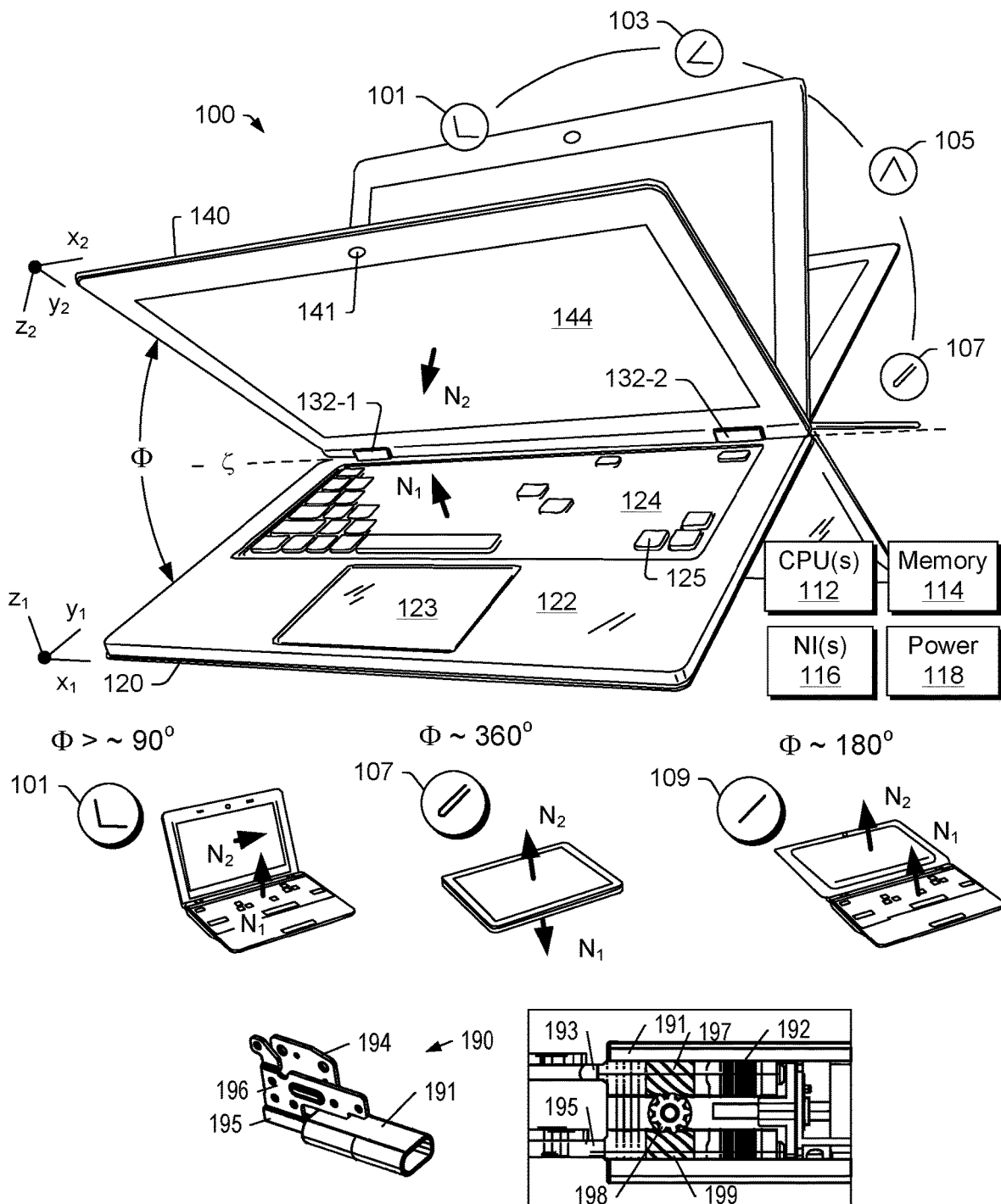
FIG. 1 is a diagram of an example of a computing device.

FIG. 1 shows an example of a computing device 100 (e.g., a computing system) that includes a keyboard housing 120 and a display housing 140 that are pivotable with respect to each other via movement about one or more hinges 132-1 and 132-2 (e.g., hinge assemblies). The computing device 100 may be a system such as, for example, a computing system (e.g., an information handling device, etc.).

As an example, the computing device 100 may include one or more processors 112, memory 114 (e.g., one or more memory devices), one or more network interfaces (NIs) 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144 and can include a camera 141 mounted in a bezel region of a bezel that surrounds the display 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a width along an x-axis ($x_2$), a depth along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a system does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the computing device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the computing device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the computing device 100, the keys 125 may be contacted by the users hand or hands. A user may perceive the springiness of the keys 125 as being somewhat undesirable. For example, springy keys may interfere with a user's ability to comprehend or sense force that is sufficient to grasp the computing device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing systems such as laptop or notebook computing devices can be characterized at least in part by a footprint. For example, the computing device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

FIG. 1 also shows an example of a hinge assembly 190, which may be utilized as the hinge 132-1 and/or the hinge 132-2. As shown in FIG. 1, the hinge assembly 190 includes a housing 191 with opposing sides, axles 193 and 195 with corresponding axes, saddles 194 and 196, gears 197, 198 and 199 and a tensioning mechanism 192 (e.g., a stack of coned washers, etc.). In the hinge assembly 190, the gear 198 is an intermediate gear that is disposed between the gears 197 and 199. As shown, the intermediate gear 198 has a rotational axis that is orthogonal to the rotational axes of the gears 197 and 199. In such an example, the intermediate gear 198 can allow for spacing of axles 193 and 195.

In the example of FIG. 1, the saddles 194 and 196 can be operatively coupled to respective housings of a device such that the housings can be oriented from an approximately 0 degree closed orientation (e.g., a closed clamshell) to an approximately 360 degree open orientation (e.g., a tablet orientation).

As an example, a computing device that includes housing coupled by one or more hinge assemblies can include one or more sensors that can sense orientation, directly and/or indirectly. For example, housings can include accelerometers, gravimeters, gyroscopes, etc., where signals can be utilized to determine an orientation of the housings with respect to one another. As an example, a computing device can include one or more magnetic field sensors, light sensors, etc., which may be able to sense presence of one housing with respect to another, for example, when a computing device is in a tablet orientation. As an example, a hinge assembly may be provided with a magnet, a sensor, circuitry, etc., which can provide for orientation sensing to determine an orientation of one housing with respect to another.

Figure 2:
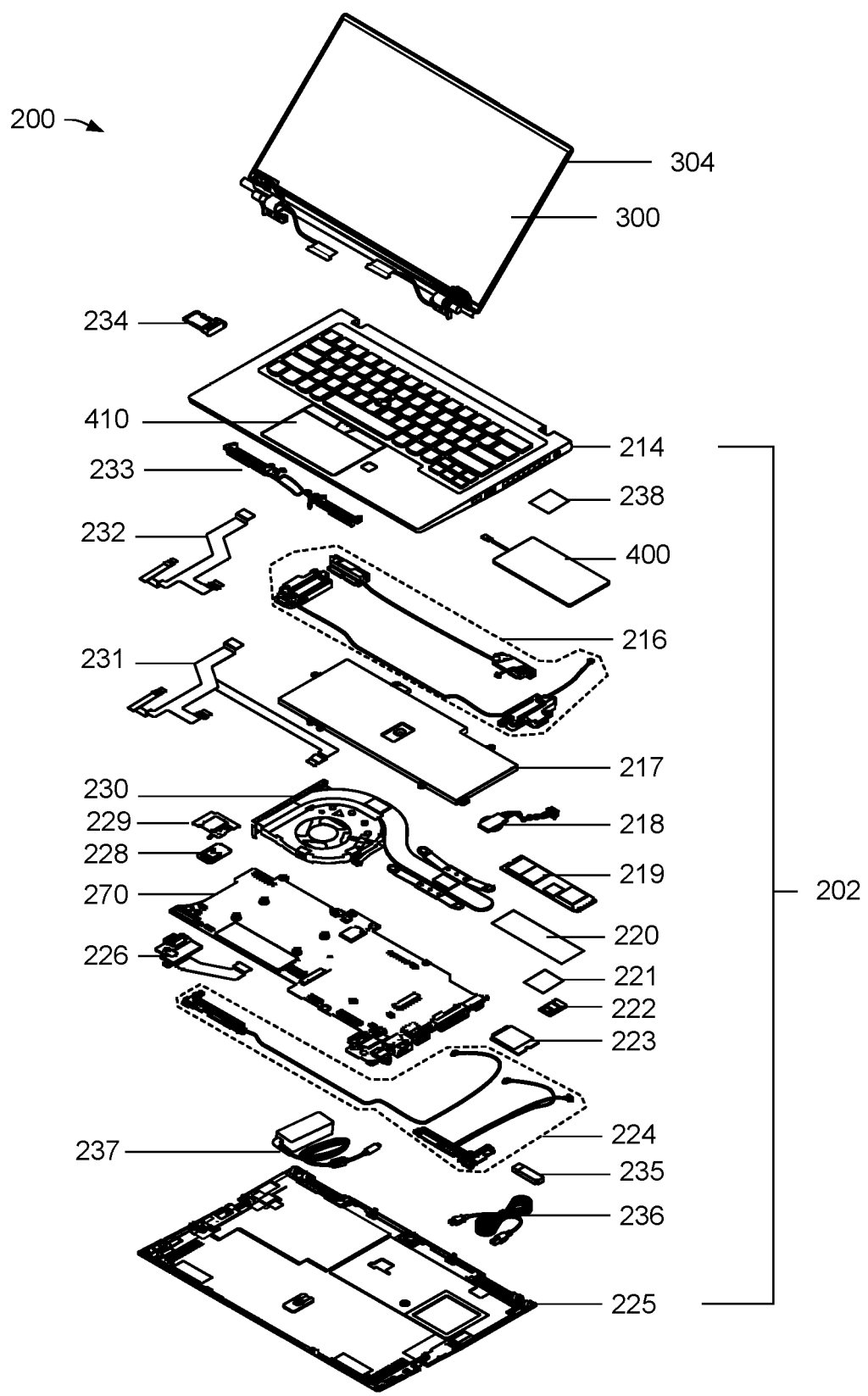
FIG. 2 is a diagram of an example of a computing device or computing system.

FIG. 2 shows an exploded perspective view of a computing device 200 as including various components, which can include, for example, a display assembly 300, a housing 304 (e.g., a display housing), a keyboard bezel assembly with a keyboard 214, a speaker kit 216, a built-in battery 217, a coin-cell battery 218, a solid-state drive 219, a thermal pad 220, NFC module foam 221, a NFC module 222, a wireless-WAN card 223, a wireless-WAN antenna assembly 224, a base cover assembly 225, a USB and power board 226, a system board 270, a fingerprint reader module 228, a fingerprint reader bracket 229, a thermal fan assembly 230, a trackpad and fingerprint reader cable 231 or 232, a wireless-LAN antenna assembly 233, a SIM-card tray 234, a recovery USB 235, a power cord 236, an AC power adapter 237, an orientation sensor 238 (e.g., an accelerometer, gyroscope, magnetic field sensor, etc.). The computing device 200 may be referred to as a computing system that can include various components, circuitry, etc.

In the example of FIG. 2, the computing device 200 is shown as including a touchpad camera viewfinder display 400 with a display surface 410. In such an example, the computing device 200 can render at least images that are viewable via the display surface 410. Content rendered using the touchpad camera viewfinder display 400 may come from one or more sources, which can include wired sources and/or wireless sources.

In the example of FIG. 2, various components can form a housing 202, which may be referred to as a base housing and/or a keyboard housing, where the housing 202 may be coupled to the housing 304 via one or more hinge assemblies, etc. For example, the computing device 200 can include a first housing 202 coupled to a second housing 304 via one or more hinge assemblies (see, e.g., one or more hinge assemblies 190 of FIG. 1, 326 of FIG. 3, etc.). As an example, a hinge assembly may be a single axle and/or axis hinge assembly or may be a multi-axle and/or multi-axis hinge assembly.

Figure 3:
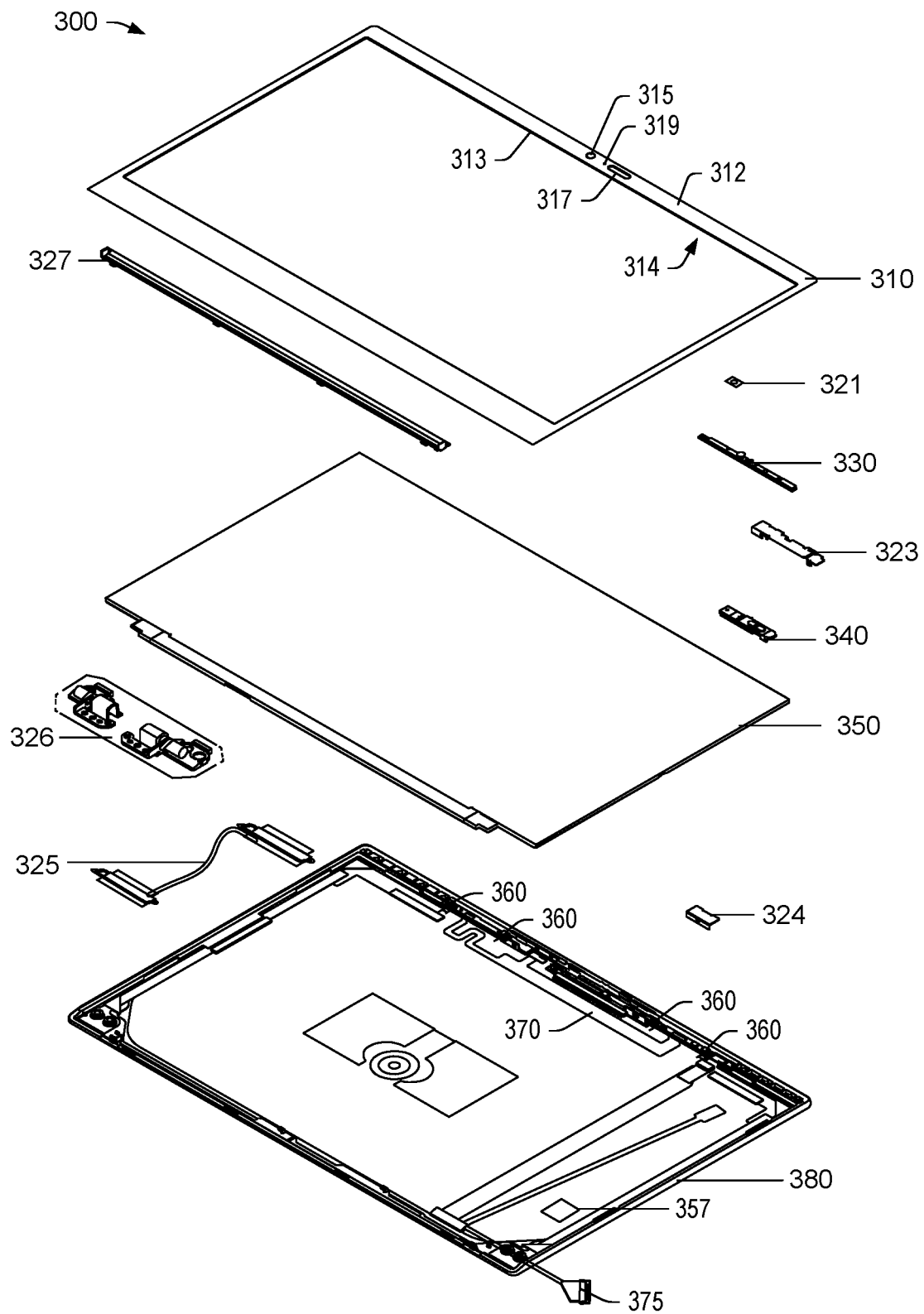
FIG. 3 is a diagram of an example of a display assembly of the computing device or computing system of FIG. 2.

FIG. 3 shows an exploded perspective view of the display assembly 300 of FIG. 2 as including various components, which can include, for example, a bezel 310, a foam component for an IR LED camera 321, a camera assembly 330, a stopper 323, a shutter 340, a display panel 350, an orientation sensor 357 (e.g., an accelerometer, gyroscope, magnetic field sensor, etc.), a support plate 324, one or more microphones 360, wiring 370, one or more wiring connectors 375, a back side (rear) cover assembly 380, a display cable 325, one or more hinge assemblies 326, and a display bezel frame component 327.

In the example of FIG. 2 and FIG. 3, the computing device 200 can include various media capture components. For example, a camera can be a media capture component, a microphone can be a media capture component, etc. A media capture component may be an audio media capture component, a video media capture component, a still image media capture component, etc.

As shown, the bezel 310 includes a front surface 312 and an opposing rear surface 314 where various openings extend between the front surface 312 and the rear surface 314. For example, as shown, the bezel 310 includes a display opening 313, a camera opening 315, a shutter control opening 317, and an IR camera opening (e.g., where an IR camera is included, noting that a camera may be a combined visible and IR camera).

As shown, the camera assembly 330 couples to the back side cover assembly 380 where the wiring 370 operatively couples to the camera assembly 330 and to the one or more microphones 360. The display assembly 300 can be operatively coupled to other circuitry of the computing device 200, for example, via the one or more wiring connectors 375.

As an example, the touchpad camera viewfinder display 400 can render images captured via one or more cameras. For example, consider the camera assembly 330 being operatively coupled to the touchpad camera viewfinder display 400 such that a camera of the camera assembly 330 can capture imagery where such imagery can be rendered, optionally in real-time, to the touchpad camera viewfinder display 400. As to real-time rendering of captured imagery, the computing device 200 can include circuitry that activates the rendering, for example, responsive to the computing device 200 being in a particular position. As an example, such circuitry may activate rendering of content captured in real-time responsive to the computing device 200 being in an orientation such as the orientation 107 of FIG. 1. In such an example, the camera assembly 330 can provide a field of view in one direction while the touchpad camera viewfinder display 400 is viewable from an opposite direction.

As an example, the computing device 200 may include a camera or cameras that face in the direction of a viewing surface of the display panel 350 only. Or, for example, the computing device 200 may include cameras that face in opposite directions (e.g., one facing in the direction of the viewing surface of the display panel 350 and one facing in an opposite direction). In such an example, the cameras may be referred to as a front facing camera and a back facing camera. As an example, the computing device 200 can include circuitry that provides for rendering imagery captured by one or more cameras, which can be one or more of a front facing camera and a back facing camera.

Figure 4:
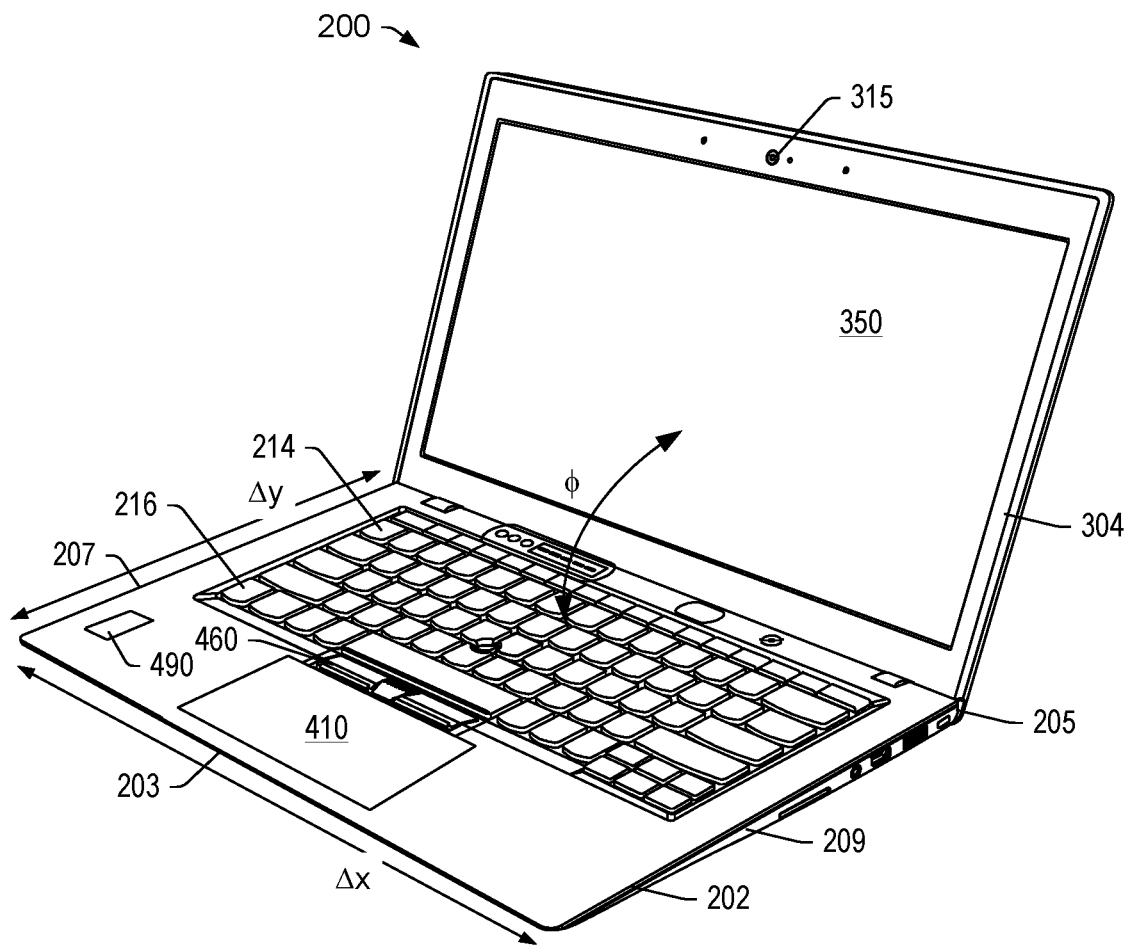
FIG. 4 is a diagram of an example of a computing device.

FIG. 4 shows an example of the computing device 200 in an open position with an open angle ϕ, which is slightly greater than 90 degrees. As explained, such a computing device can be opened to a 360 degree position (see, e.g., the orientation 107 of FIG. 1). As shown in the example of FIG. 4, the computing device 200 can include the housing 202 with a front end 203, a back end 205 and opposing sides 207 and 209 (e.g., a left side and a right side, respectively). As shown, the keyboard 214 includes keys where one or more keys 216 may be programmed for utilization in combination with the touchpad camera viewfinder display 400 with the display surface 410. A key, a button, etc., can be a switch that can be actuated for one or more purposes. For example, consider a lower left key of the keyboard 214 that can be programmed to operate in one or more modes, which may depend on position of the housings 202 and 304 and/or one or more other factors. As shown in the example of FIG. 4, the housing 202 may include a button 490 and optionally one or more control buttons 460, which may include, for example, a left button and a right button (e.g., for left click and right click operations, etc.).

As shown in the example of FIG. 4, the display surface 410 is positioned akin to a touchpad such as, for example, the touchpad 123 of the computing device 100 of FIG. 1. The display surface 410 is positioned approximately centrally (e.g., overlapping a midline) between the opposing sides 207 and 209 and between a front end of the keyboard 214 and the front end 203 of the housing 202. In the example of FIG. 4, the width of the display surface 410 is less than the width of the keyboard 214, though it may be equal to or greater than the width of the keyboard 214. As to the depth of the display surface 410, in the example of FIG. 4, it is less than the depth of the keyboard 214. In general, a keyboard can be of a greater depth than a touchpad and, for example, a display surface of a touchpad camera viewfinder display.

Notebook form factor computing devices find use in work environments, home environments, school environments, etc. When utilized for video calls, a user may actuate a front facing camera (e.g., as part of a conference call application, etc.). When it comes to taking photographs, a front facing camera of a notebook computing device may be utilized less often than a back facing smartphone camera or a back facing camera of a tablet computing device. A back facing camera of a device with a front facing display usually allow a user to view a scene captured by the back facing camera using the front facing display. As mentioned, such an approach demands the presence of a back facing camera. In instances where a device has only a front facing camera, to take a photograph or capture video, a user has to face the device toward a scene where the front facing display, being on the same side as the front facing camera, is facing away from the user.

As an example, a computing device such as, for example, the computing device 200, can allow for a 360 degree open orientation such that a front facing camera can become back facing while a touchpad camera viewfinder display remains front facing for viewing of a scene captured by the camera. In such an example, workers, students, travelers, etc., can utilize such a computing device camera for field trip photos, scanning documents, making videos, etc., using a camera that faces the same direction as a viewing surface of a display of a display housing that is coupled to a keyboard housing with a touchpad camera viewfinder display.

In various instances, utilization of a notebook computing device for image capture may provide benefits over a smartphone. For example, various smartphones utilize operating systems with limited file management capabilities when compared to the operating system of a notebook computing device. For example, file manipulations, sharing, editing, etc., can be more readily accomplished using a more advanced file system, which may not exist for a smartphone. Additionally, as smartphones become larger and notebooks become smaller, a user may find carrying a notebook to be less of an inconvenience and thereby utilize the notebook for more image capture tasks.

As an example, a notebook computing device that includes a 360 degree hinge assembly may be referred to as a convertible as it can "convert" into a tablet form factor when opened 360 degrees (see, e.g., the orientation 107 of FIG. 1).

As an example, a convertible 360 degree hinge notebook computing device can include a touchpad camera viewfinder display as a secondary display opposite the forward-facing camera in a convertible tablet orientation and mode where the touchpad camera viewfinder display can function as a viewfinder for the camera. Such an approach allows the notebook computing device to be used in a manner akin to a viewfinder camera. In such an approach, the notebook computing device can utilize the touchpad camera viewfinder display ergonomically for scanning, holding-up for photo shooting and videos, etc.

As an example, a display housing may be thinner or lighter with a single front facing camera rather than a front facing camera and a back facing camera. As an example, a single camera, cost-wise, can be less than two cameras or cost saving from use of a single camera rather than two cameras may be devoted to a single higher quality camera.

Figure 5:
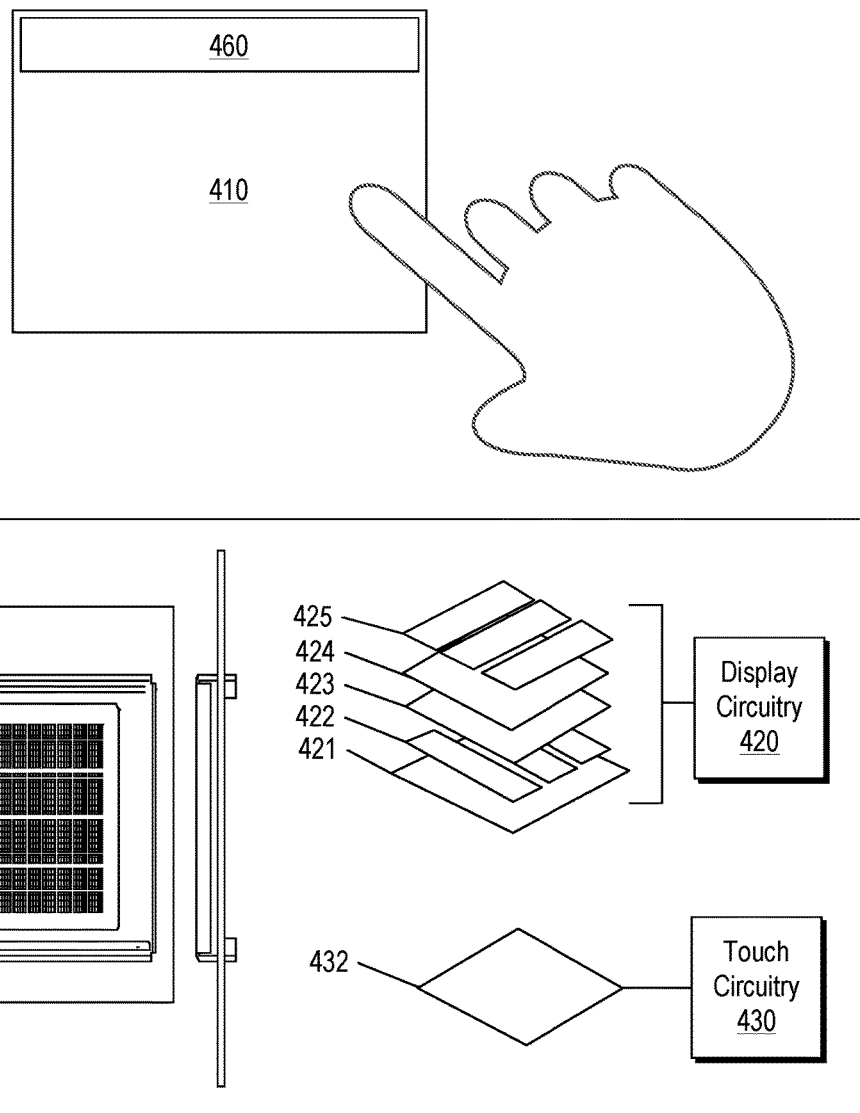
FIG. 5 is a series of diagrams of examples of components.

FIG. 5 shows an example of the touchpad camera viewfinder display 400 with a display surface 410 and one or more optional control buttons 460. As an example, such a display can include an LCD assembly, an Organic Light Emitting Diode (OLED) assembly, etc. In the example of FIG. 5, an OLED assembly 420 is shown that includes OLED display components such as, for example, a substrate 421, an anode 422, a conductive layer (e.g., organic molecules or polymers) 423, an emissive layer (e.g., organic molecules or polymers) 424 and a cathode 425. As shown, the touchpad camera viewfinder display 400 includes display circuitry 420, which may be operatively coupled to one or more of the OLED display components or, for example, one or more LCD assembly components. FIG. 5 also shows touch circuitry 430 as being operatively coupled to a touch sensing layer 432. As explained, the touchpad camera viewfinder display 400 can be a touch-screen display.

As an example, a touchpad camera viewfinder display may be about 5 cm to about 15 cm or more in a widthwise dimension and may be about a 3 cm to 10 centimeters in a depthwise dimension.

As an example, a touchpad camera viewfinder display may be defined using a diagonal measure. For example, consider a diagonal distance greater than 5 cm to about 15 cm or more. As an example, a touchpad camera viewfinder display may be an LCD multi-touch display with IPS technology. For example, consider a 4.7 inch diagonal display with a 1334-by-750-pixel resolution at 326 ppi. Such a display may have a contrast ratio in excess of 500:1. As an example, a touchpad camera viewfinder display may include a cover with a fingerprint-resistant oleophobic coating.

As an example, a touchpad camera viewfinder display can include one or more of a serial and/or parallel microprocessor (MPU) interface, can include one or more of SPI, I²C, parallel, etc., interfaces, etc.

As to touch sensing, a touchpad camera viewfinder display can include a touch digitizer layer. For example, consider one or more of capacitive touch sensors and resistive touch sensors. As to a capacitive sensing digitizer layer, it can include projected capacitive touch (PCT) technology with detection materials etched into a layer as a grid. In such an example, the grid can project an electrostatic field when a voltage is applied, and when a human finger (which is electrically conductive) touches the area covered by this grid, the electrostatic field is altered. As shown in the example of FIG. 5, the touch circuitry 432 can be operatively coupled to the touch sensing layer 432 such that the touch circuitry 432 can determine a position of a finger or fingers.

As to a capacitive touchscreen, it can include substantially transparent indium tin oxide to form a capacitive electrode grid in a digitizer layer. As an example, a touch digitizer layer can be placed above a liquid crystal layer and below a protecting layer. With some active matrix OLED (AMOLED) displays, a touch sensing digitizer may be integrated into the same layer as OLEDs, which may reduce space. For example, the touch sensing layer 432 of FIG. 5 may be integrated into an OLED assembly. As an example, a protective layer can be protective glass. As an example, a digitizer and display can be attached tightly together as a single panel with a transparent protective cover.

Figure 6:
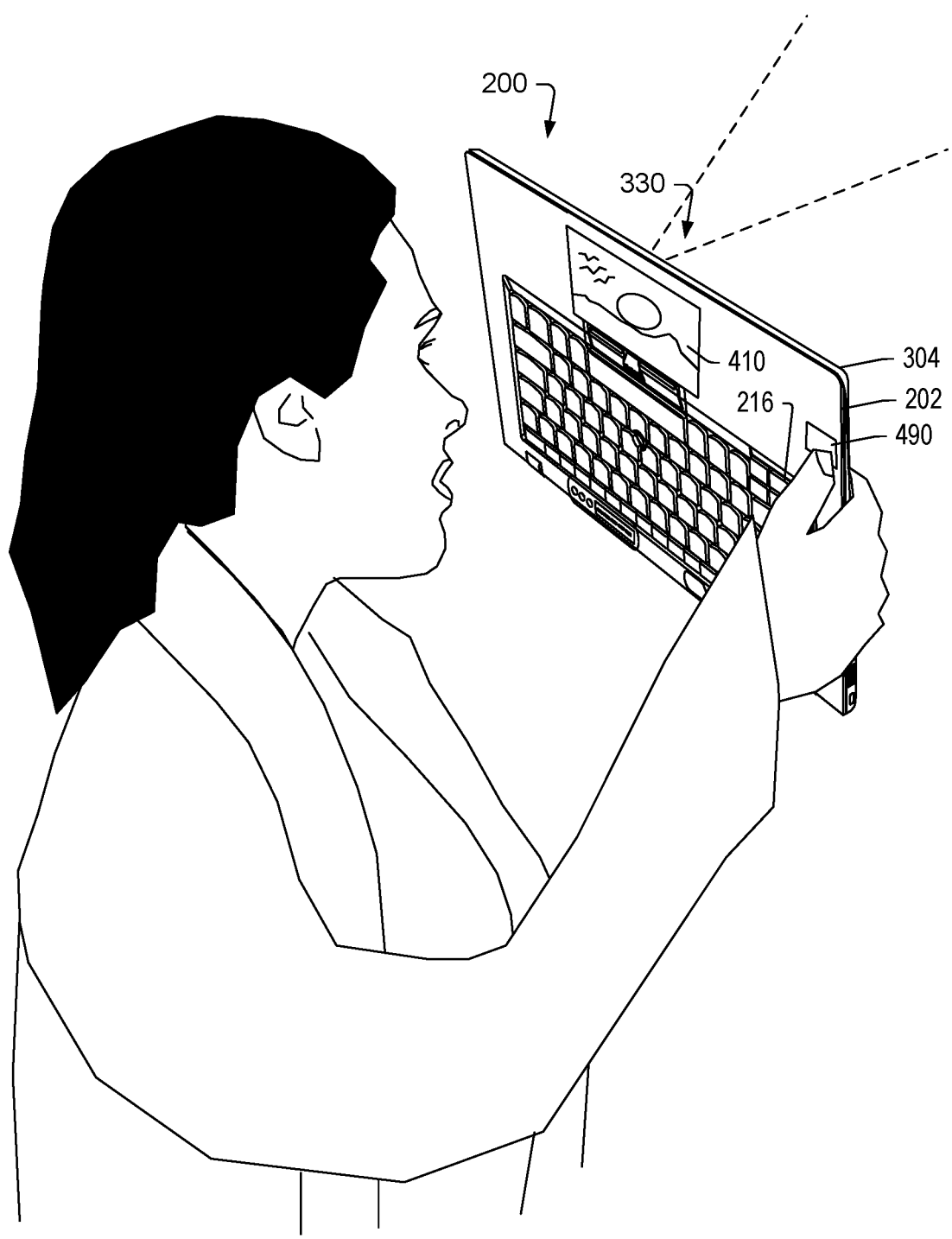
FIG. 6 is a diagram of an example of a computing device.

FIG. 6 shows an example of the computing device 200 in a tablet orientation where the display surface 410 of the keyboard housing 202 is utilized to render a view captured by a camera of the display housing 304. As shown in the example of FIG. 6, the user may actuate one or more keys 216 of the keyboard 214 and/or the button 490, if present. In such an example, the user may actuate a key, a button, etc., to snap a photo, commence and/or stop video capture, change mode of operation, etc.

Figure 7:
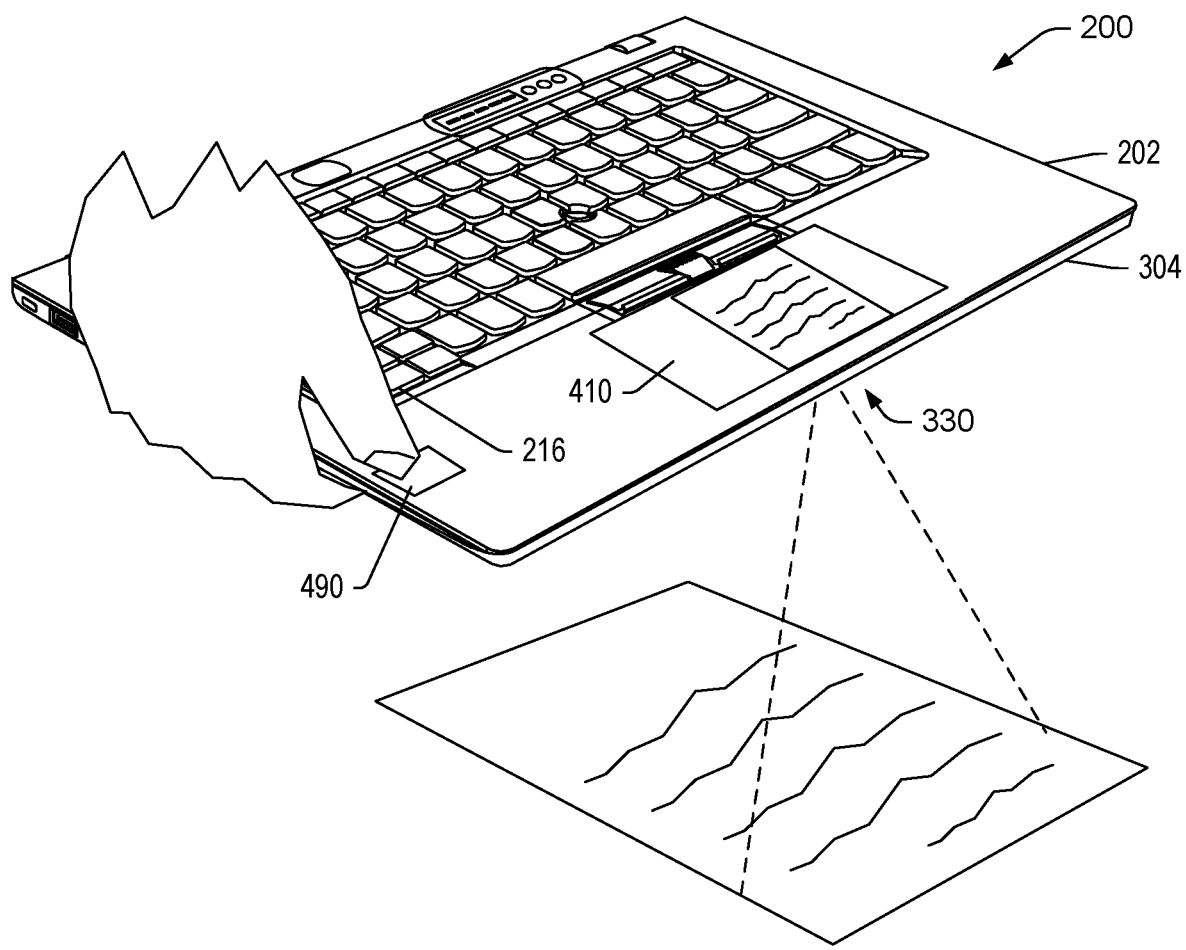
FIG. 7 is a diagram of an example of a computing device.

FIG. 7 shows an example of the computing device 200 in a tablet orientation where the display surface 410 of the keyboard housing 202 is utilized to render a view captured by a camera of the display housing 304. As shown in the example of FIG. 7, the user may actuate one or more keys 216 of the keyboard 214 and/or the button 490, if present. In such an example, the user may actuate a key, a button, etc., to snap a photo, commence and/or stop video capture, change mode of operation, etc.

In the example of FIG. 7, the computing device 200 may be utilized to capture an image of a document, for example, in a scan mode. As an example, the computing device 200 can include scan processing capabilities such as, for example, document optimization (e.g., color, contrast, skew, etc.) and, for example, optical character recognition. In such an example, a user may avoid having to use a separate scanning device (e.g., a multi-function printer, etc.) to scan the document and process the document. Such an approach can be more secure than an approach that relies on a file transfer via a network connection, which may be required if a smartphone, a scanner, etc., are utilized. Further, delay may be reduced as a scanned document can be readily available for use, processing, transmission to one or more addresses, etc.

Figure 8:
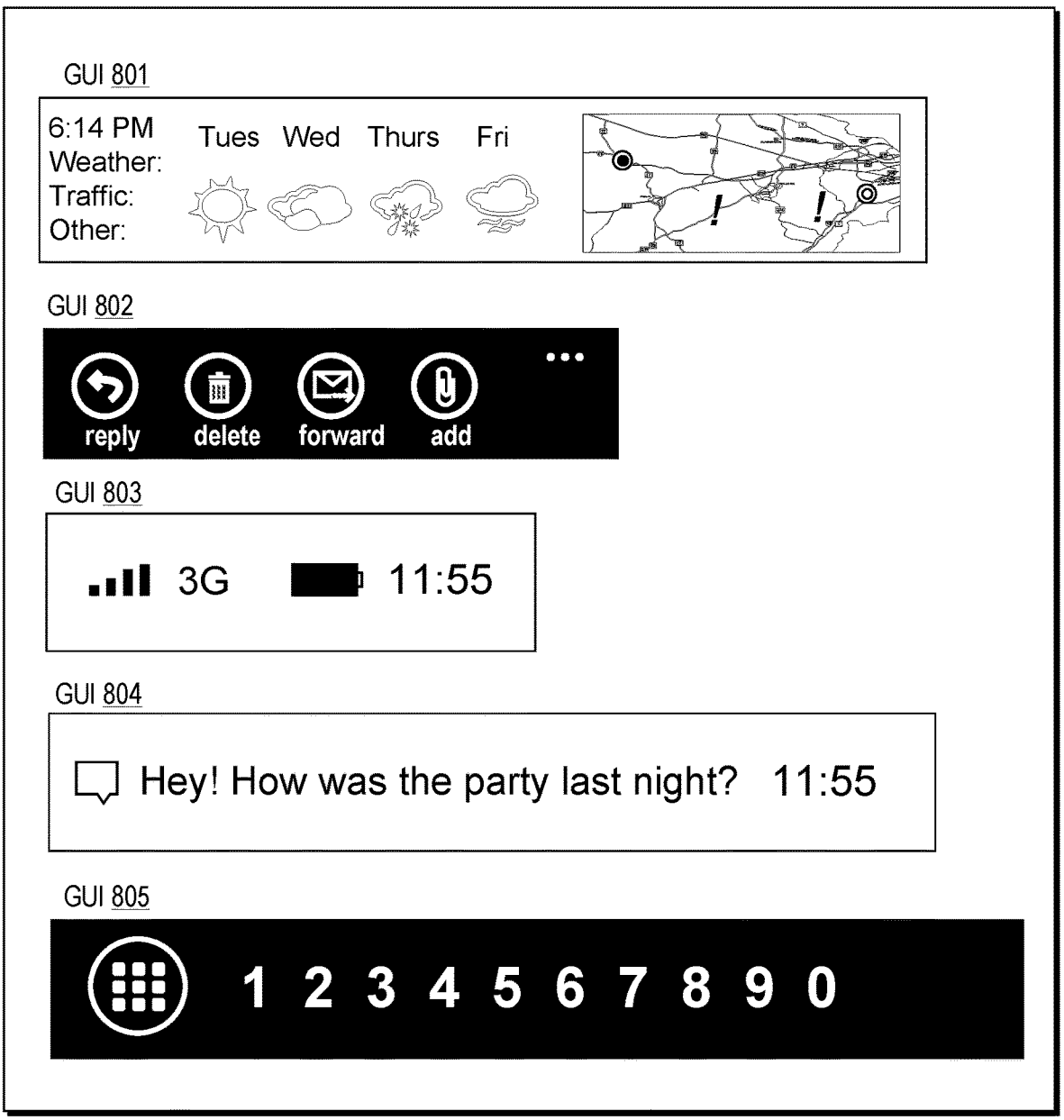
FIG. 8 is a series of diagrams of examples of graphical user interfaces.

FIG. 8 shows various examples of graphical user interfaces (GUIs) 801, 802, 803, 804 and 805. The GUI 801 shows information such as weather and/or traffic information, which may be from a service (e.g., an Internet service, a cellular service, etc.). The GUI 802 shows information associated with email. The GUI 803 shows information associated with a connection, power and time, which may be that of a device or a device that is in communication with a touchpad camera viewfinder display. The GUI 804 shows messaging information. The GUI 805 shows a keypad graphic with keys that may be utilized, for example, for numeric entry to perform one or more operations (e.g., dial a phone number, operate a calculator, etc.).

As an example, the touchpad camera viewfinder display 400 can mirror a smartphone display of a smartphone such that a user of the computing device 200 can view content of the smartphone and optionally instruct the smartphone. Such an approach can provide for expedited workflows, less actions when wanting to view a smartphone display, etc. For example, a user may be typing a document using the keyboard 214 of the keyboard housing 202 while viewing the display panel 350 of the display housing 304. In such an example, when the user's smartphone receives a call, the touchpad camera viewfinder display 400 can enter a mirror mode that renders content of the display of the smartphone. In such an example, the user may continue typing in the document without lifting her fingers from the keyboard 214 and glance down to see who is calling. If the user does not want to answer the call, the user may continue typing, optionally touching the touchpad camera viewfinder display 400, clicking a button, pressing a key or keys, uttering a voice command, etc., to switch the touchpad camera viewfinder display to a non-mirror mode. In the instance that the user does want to answer the call, the user may touch the touchpad camera viewfinder display 400, click a button, press a key or keys, utter a voice command, etc., where the display panel 350 may optionally be utilized to render content from the smartphone (e.g., consider a video call, etc.) such that the user does not need to look downwardly, which may be less than optimal ergonomic during a phone or conference call.

Figure 9:
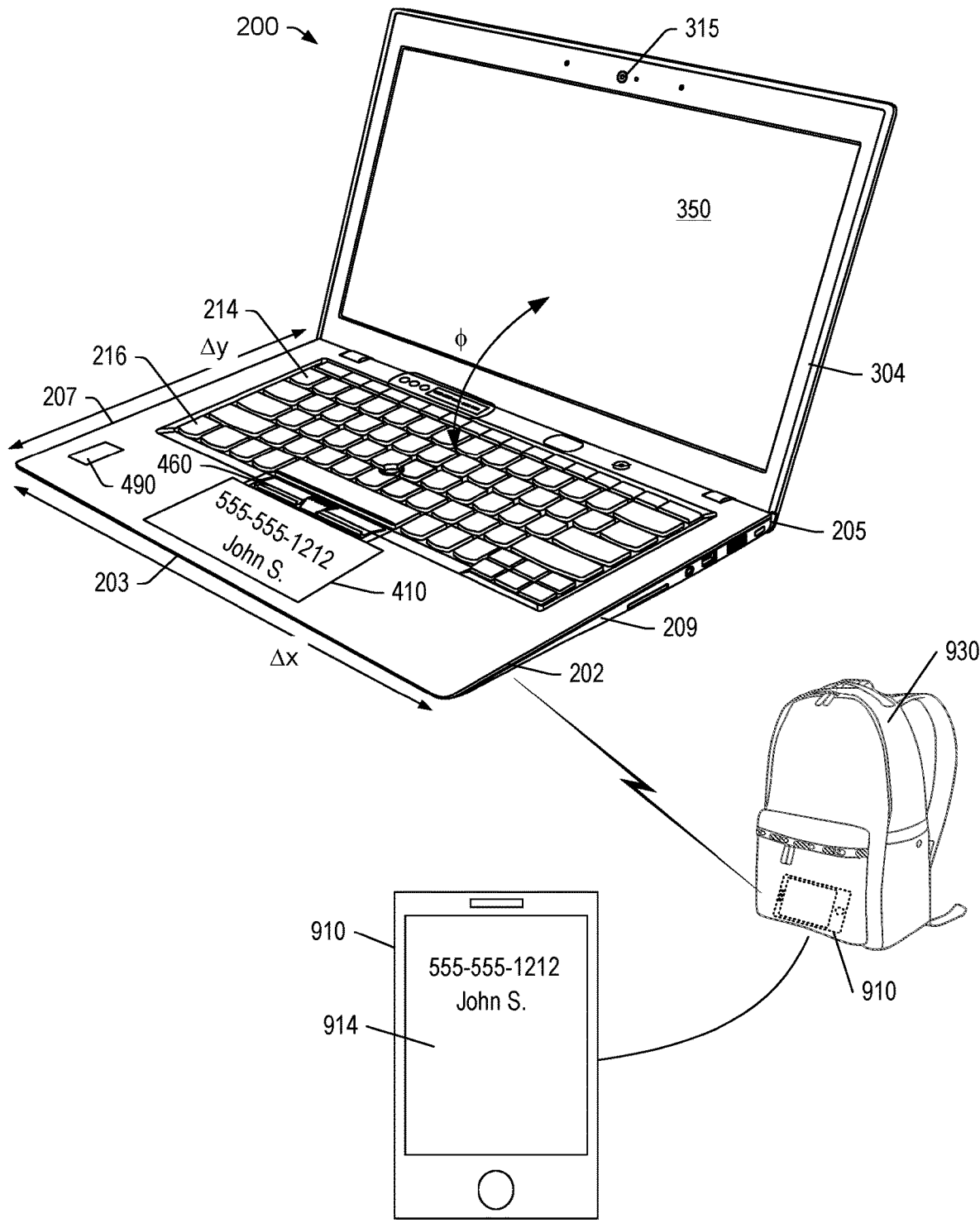
FIG. 9 is a diagram of an example of a computing device and an example of another device.

FIG. 9 shows an example of the computing device 200 as being in communication with another device 910, which may be, for example, a smartphone with a display 914. As shown, the device 910 may be in a backpack 930 (e.g., a bag, a purse, etc.) and wirelessly in communication with the computing device 200 such that a notification generated by the device 910 is communicated to the computing device 200 and rendered to the display surface 410 (e.g., consider WiFi, BLUETOOTH, etc.). In such an example, one or more graphic controls may be rendered to allow a user to touch the display surface 410 to instruct the computing device 200 to interact with the device 910. For example, consider a "Y" graphic for answering the phone call and a "N" graphic for not answering the phone call (e.g., dismissing the call). As an example, where the user touches the "Y" graphic, the phone call may occur via a speaker and microphone of the computing device 200 (e.g., or a headset, etc.) where, for example, a live stream video of the caller may be rendered to the display panel 350.

As an example, a touchpad camera viewfinder display may operate in various modes where such modes may include a remote viewfinder mode. For example, consider utilization of an auxiliary camera, which may be operatively coupled to a computing device via wire and/or wirelessly such that imagery captured by the auxiliary camera can be rendered to the touchpad camera viewfinder display. For example, consider a security camera, a baby monitoring camera, a smartphone camera, etc. In such examples, one or more timers, motion detectors, etc., may be utilized to control rendering (e.g., image rendering, brightness, etc.). As an example, a computing device may be programmable to allow for connection to one or more on-board cameras and/or one or more auxiliary cameras where, for example, a user may scroll or otherwise navigate imagery captured by such one or more cameras (e.g., optionally as thumbnails where larger versions can be rendered to a primary display, etc.). As an example, consider a front door camera as an auxiliary camera that may be part of a camera-enabled doorbell device where upon detection of motion, detection of a person, a ring of a doorbell, etc., imagery captured by the front door camera can be rendered to a touchpad camera viewfinder display of a computing device, which may replace existing imagery of a baby monitoring camera, etc. As an example, a computing device can include a programmable hierarchy of functions with respect to various modes for rendering content, whether from a camera, cameras, a smartphone and/or one or more other devices.

As an example, a touchpad camera viewfinder display of a computing device can provide for viewing imagery captured by a camera or cameras in real-time, where a camera or cameras can include an integrated camera or cameras of the computing device and/or a separate or separable camera or cameras.

As an example, a touchpad camera viewfinder display can be utilized for one or more purposes such as, for example, one or more of home security, smartphone, performance data (e.g., of a computing device such as memory, processor utilization, network information, etc.), etc.

As an example, where a display housing of a computing device includes a back facing camera, a touchpad camera viewfinder display may render imagery captured by the back facing camera. For example, consider a user in a coffee shop or other location where the user's view of the environment is blocked by the display housing. In such an example, the computing device may operate in a surveillance mode such that the user can see beyond the display housing via the touchpad camera viewfinder display. In such an example, a motion detection application may be utilized that can detect motion where, upon detection of motion, the touchpad camera viewfinder display can be activated (e.g., with a desired level of brightness) such that the user can see what is going on without having to fold down the display housing.

As an example, a computing device can include a processor; memory accessible to the processor; a display housing that includes a display and a camera; a base housing that includes a keyboard and a camera viewfinder display for the camera; and a hinge assembly that couples the display housing and the base housing. In such an example, the camera viewfinder display can include touch sensing circuitry and may be referred to as a touchpad camera viewfinder display. In such an example, the camera viewfinder display can function as a touchpad in a touchpad mode and can function as a camera viewfinder in a camera viewfinder mode. In such an example, the camera viewfinder display may include one or more other modes such as, for example, a smartphone mode, a performance mode, a remote camera mode, etc.

As an example, a hinge assembly can be a 360 degree hinge assembly for transition of a display housing and a base housing between a closed position and a fully open position. In such an example, the processor can activate the camera viewfinder display responsive to a transition to the fully open position where, in the fully open position, the camera and the camera viewfinder display face opposite directions. In such an example, the processor may receive a signal or signals from one or more sensors and may, for example, automatically activate the camera viewfinder display (e.g., in a camera viewfinder mode).

As an example, a base housing can include a bottom side, a top side, a hinge end and a front end, where a camera viewfinder display is disposed on the top side between the keyboard and the front end.

As an example, a camera viewfinder display can function to replicate a smartphone display in a phone mode (e.g., or smartphone mode). In such an example, a user may place a call or otherwise interact with a smartphone via the camera viewfinder display.

As an example, a display housing can include a camera, which may be the only camera of the display housing. As an example, a display housing can include a display side and a back side, where a camera is a display side camera. As an example, a display housing can include another camera that is a back side camera. In such an example, the camera viewfinder display can function in one or more of a display side camera mode and a back side camera mode. For example, in the back side camera mode, the processor can activate the camera viewfinder display responsive to detection of motion by the back side camera. In such an example, responsive to detection of motion by the back side camera, the processor may call for rendering of a notification to the display and, for example, simultaneous rendering of imagery to the camera viewfinder display.

As an example, a computing device can include an actuatable button adjacent to a camera viewfinder display. For example, consider an actuatable button being one or more of a right click button and a left click button. In such an example, in a camera viewfinder mode of the camera viewfinder display, the actuatable button can be for a camera related function or functions. For example, consider a camera related function that includes a record function. As an example, a camera viewfinder mode can include one or more of a display side camera mode and a back side camera mode and a record function can record content from one or more of a camera as a display side camera and another camera as a back side camera.

As an example, a camera viewfinder display can function as a menu in a menu mode.

As an example, a method can include, in a computing device that includes a display housing that includes a display and a display side camera, a base housing that includes a keyboard and a camera viewfinder display for the display side camera, and a hinge assembly that couples the display housing and the base housing, activating the camera viewfinder display responsive to a transition of the display housing and the base housing to a fully open, 360 degree position. In such an example, the method can include, responsive to another transition of the display housing and the base housing to an open position less than the fully open, 360 degree position, switching the camera viewfinder display to a touchpad mode. As explained, a method can include receiving a signal or signals from one or more sensors that may provide an indication of how housings are oriented with respect to one another.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

While various examples of circuits or circuitry have been discussed, FIG. depicts a block diagram of an illustrative computer system 1000. The system 1000 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1000.

Figure 10:
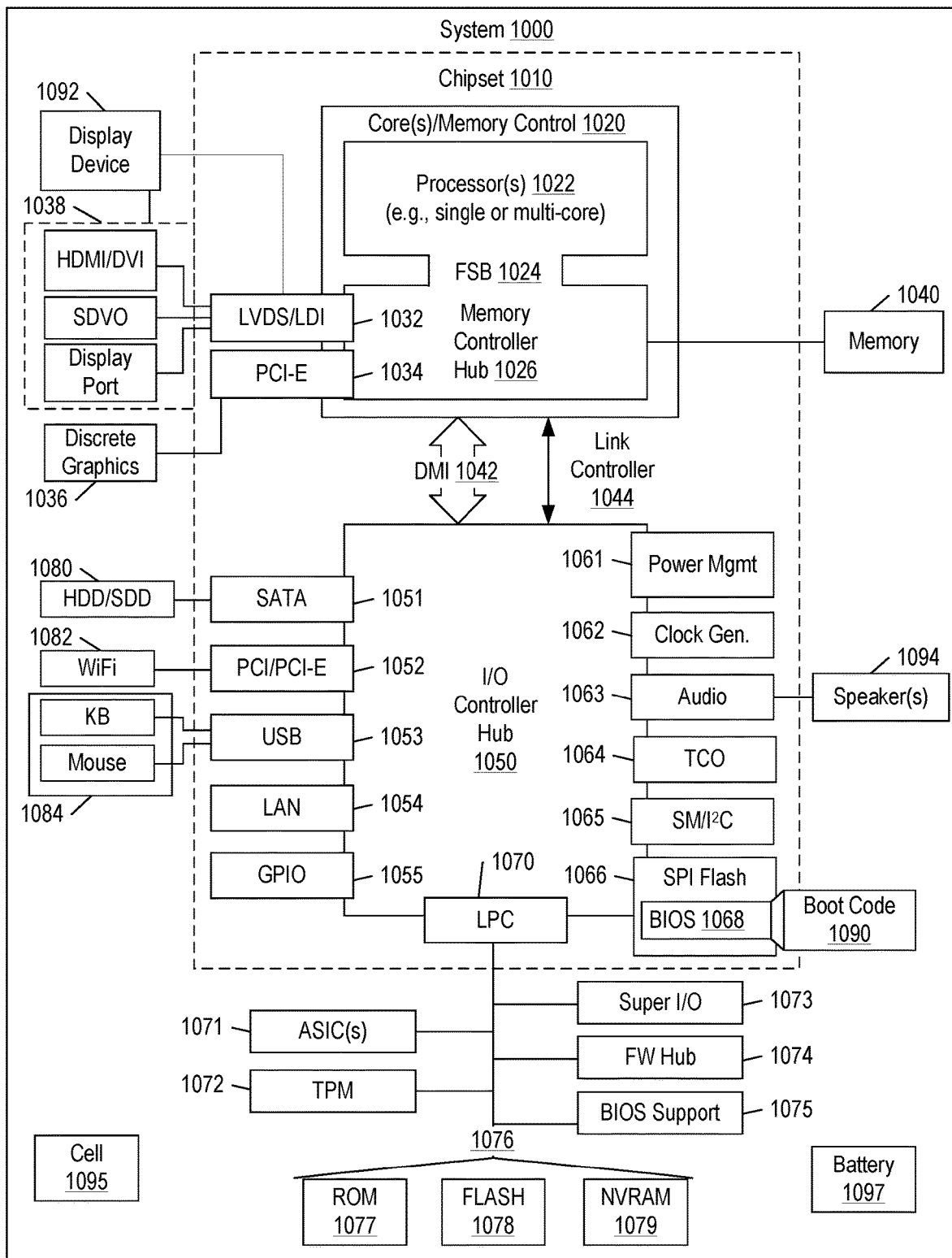
FIG. 10 is a diagram of an example of a system that includes one or more processors.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
a processor;
memory accessible to the processor;
a display housing that comprises a display and a camera;
a base housing that comprises a keyboard and a camera viewfinder display for the camera; and
a hinge assembly that couples the display housing and the base housing, wherein the hinge assembly comprises a 360 degree hinge assembly for transition of the display housing and the base housing between a closed position and a fully open position, and wherein the processor activates the camera viewfinder display responsive to a transition to the fully open position.

2. The computing device of claim 1, wherein the camera viewfinder display comprises touch sensing circuitry.

3. The computing device of claim 2, wherein the camera viewfinder display functions as a touchpad in a touchpad mode and functions as a camera viewfinder in a camera viewfinder mode.

4. The computing device of claim 1, wherein, in the fully open position, the camera and the camera viewfinder display face opposite directions.

5. The computing device of claim 1, wherein the base housing comprises a bottom side, a top side, a hinge end and a front end, wherein the camera viewfinder display is disposed on the top side between the keyboard and the front end.

6. The computing device of claim 1, wherein the camera viewfinder display functions to replicate a smartphone display in a phone mode.

7. The computing device of claim 1, wherein the display housing comprises the camera as the only camera of the display housing.

8. The computing device of claim 1, wherein the display housing comprises a display side and a back side, wherein the camera is a display side camera.

9. The computing device of claim 8, further comprising another camera that is a back side camera.

10. The computing device of claim 9, wherein the camera viewfinder display functions in one or more of a display side camera mode and a back side camera mode.

11. The computing device of claim 10, wherein, in the back side camera mode, the processor activates the camera viewfinder display responsive to detection of motion by the back side camera.

12. The computing device of claim 11, wherein, responsive to detection of motion by the back side camera, the processor calls for rendering of a notification to the display.

13. The computing device of claim 1, comprising an actuatable button adjacent to the camera viewfinder display.

14. The computing device of claim 13, wherein the actuatable button comprises one or more of a right click button and a left click button.

15. The computing device of claim 14, wherein, in a camera viewfinder mode of the camera viewfinder display, the actuatable button comprises a camera related function.

16. The computing device of claim 1, wherein the camera viewfinder display functions as a menu in a menu mode.

17. A method comprising:
in a computing device that comprises a display housing that comprises a display and a display side camera, a base housing that comprises a keyboard and a camera viewfinder display for the display side camera, and a hinge assembly that couples the display housing and the base housing, activating the camera viewfinder display responsive to a transition of the display housing and the base housing to a fully open, 360 degree position.

18. The method of claim 17, comprising, responsive to another transition of the display housing and the base housing to an open position less than the fully open, 360 degree position, switching the camera viewfinder display to a touchpad mode.

19. A computing device comprising:
a processor;
memory accessible to the processor;
a display housing that comprises a display and a camera;
a base housing that comprises a keyboard, a camera viewfinder display for the camera, an actuatable button adjacent to the camera viewfinder display, wherein the actuatable button comprises one or more of a right click button and a left click button; and
a hinge assembly that couples the display housing and the base housing.

20. The computing device of claim 19, wherein, in a camera viewfinder mode of the camera viewfinder display, the actuatable button comprises a camera related function.

\* \* \* \* \*